No. 770,600. PATENTED SEPT. 20, 1904.
A. MORCOM.
SPINDLE BEARING, ESPECIALLY APPLICABLE TO CENTRIFUGAL PUMPS.
APPLICATION FILED APR. 27, 1903.
NO MODEL. 3 SHEETS—SHEET 1.

Witnesses:

Inventor
Alfred Morcom
By James L. Norris
Atty.

No. 770,600. PATENTED SEPT. 20, 1904.
A. MORCOM.
SPINDLE BEARING, ESPECIALLY APPLICABLE TO CENTRIFUGAL PUMPS.
APPLICATION FILED APR. 27, 1903.
NO MODEL. 3 SHEETS—SHEET 3.

Witnesses:

Inventor
Alfred Morcom
By James L. Norris.
Atty.

No. 770,600.

Patented September 20, 1904.

UNITED STATES PATENT OFFICE.

ALFRED MORCOM, OF BIRMINGHAM, ENGLAND.

SPINDLE-BEARING ESPECIALLY APPLICABLE TO CENTRIFUGAL PUMPS.

SPECIFICATION forming part of Letters Patent No. 770,600, dated September 20, 1904.

Application filed April 27, 1903. Serial No. 154,527. (No model.)

*To all whom it may concern:*

Be it known that I, ALFRED MORCOM, a subject of the King of Great Britain and Ireland, residing at Ledsam Street Works, Birmingham, England, have invented certain new and useful Improvements in and Relating to Spindle-Bearings Especially Applicable to Centrifugal Pumps, (for which I have made application for Letters Patent in Great Britain, No. 24,520, bearing date November 8, 1902,) of which the following is a specification.

My invention relates to the bearings of centrifugal pump-spindles. In such pumps trouble is often occasioned, more especially when the suction-lift is considerable, through air leaking past the spindle stuffing-box and causing the pump to lose its water. The ordinary method of preventing this leakage by screwing up the packing is objectionable, owing to the increased friction and consequent excessive wear of the spindle.

The object of my invention is to provide means which will effectually prevent this leakage of air and which at the same time are free from the above objections.

My invention consists in the spindle-packing devices hereinafter described. This device may take the form of a flexible, thin, flat, or corrugated metal plate or the like or a rubber disk with air-tight joint made by a rubber ring or otherwise at the fixed outer circumference and with a bearing-piece of white or other metal to make an air-tight joint sucked by the pump-suction against the shoulder formed or fixed on the revolving shaft. A plate with rubber jointing and springs on the outside to give necessary flexibility or to start the joint may also be used. According to my invention I also feed water from the discharge side of the pump into the space between the partition, disk, ring, or the like and the bearing-bush in which the spindle runs, so that excessive pressure may not occur between the bearing-ring and the shaft shoulder or collar.

Figure 1:
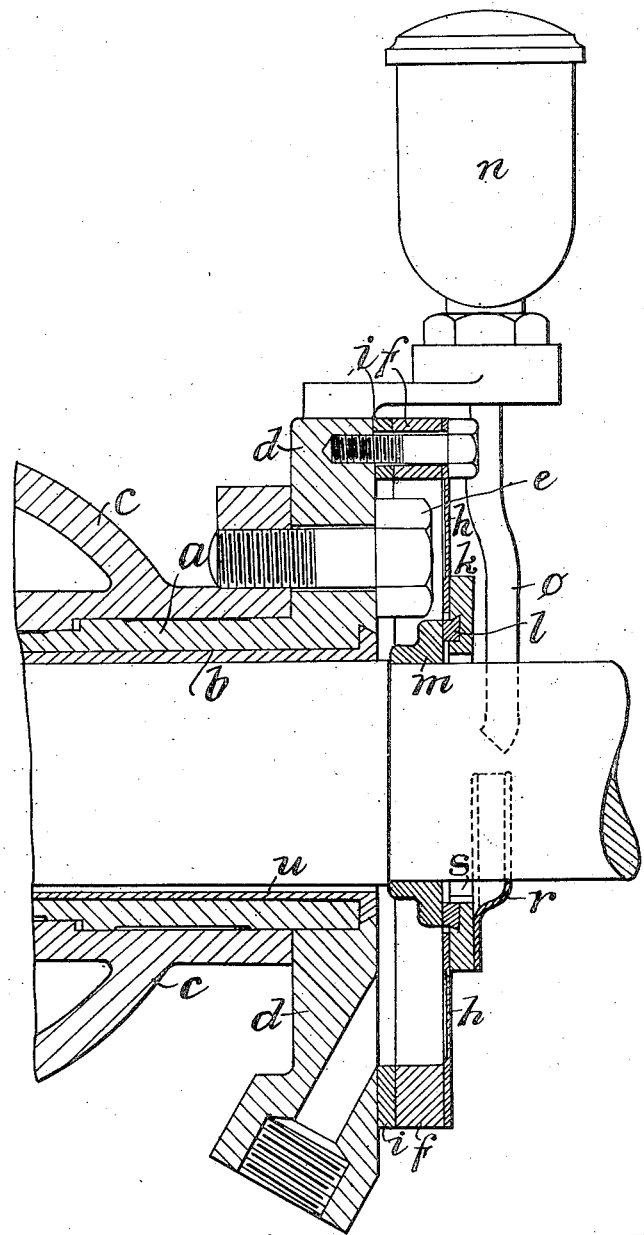
Figure 2:
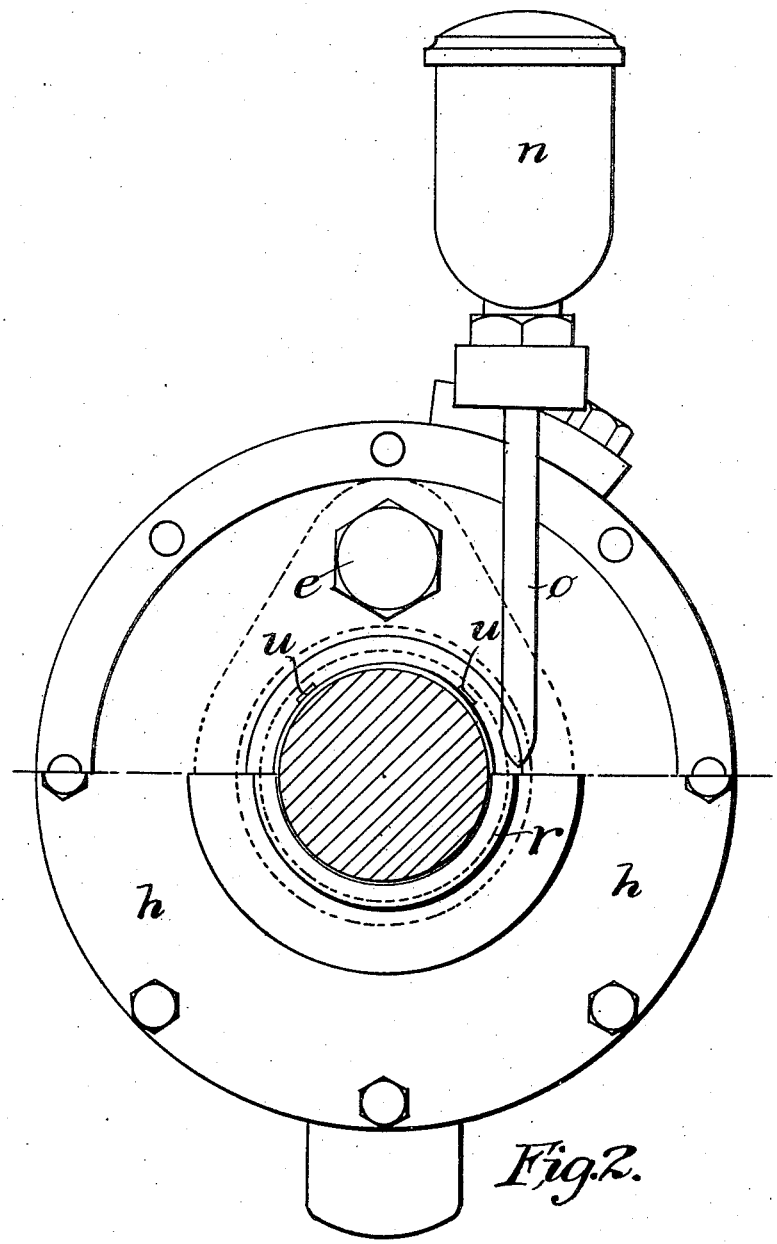
Figure 3:
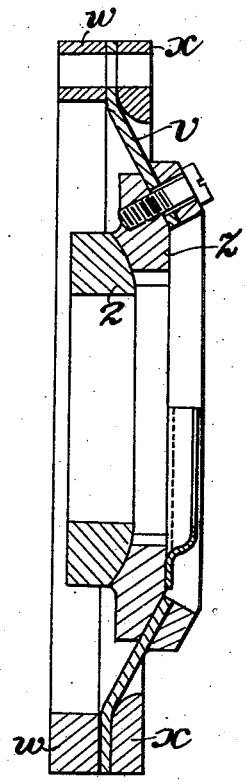
Figure 4:
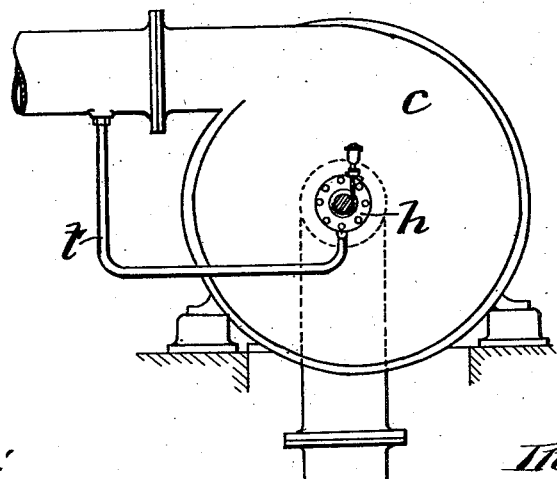

Referring to the accompanying drawings, Figure 1 is a longitudinal section through the bearing of a spindle, showing the application of one form of my invention. Fig. 2 is a corresponding end view, the flexible element being supposed to be removed in the upper half of the figure. Fig. 3 is a sectional view showing such parts as are necessary for describing a modification of my invention, while Fig. 4 shows an elevation of a centrifugal pump to which my invention is applied as a whole.

According to one form of my invention the bearing-bush $a$, which is lined with white metal $b$ in the usual way, takes the form of a sleeve fitting into a corresponding recess in the pump-casing $c$ and is provided with a flange $d$, by means of which and the screw-pin $e$ it is secured in place. To the face of this flange at its largest circumference a metal ring $f$, to which the flexible disk $h$ is preferably brazed, is secured by screw-pins or otherwise, care being taken to make an air-tight joint between the metal ring and flange by interposing an india-rubber ring $i$ or by any other well-known method. The thin flexible disk $h$, which is of annular shape, surrounding the spindle, is conveniently made of a metal, such as phosphor-bronze, possessing the necessary resilience and flexibility and may be either flat with its center part between its inner and outer edges, turned down to about a sixty-fourth part of an inch in thickness, as shown in Fig. 1, or it may be corrugated. The inner part of this disk is secured, preferably by brazing, to another ring $k$, faced with white metal $l$, which in its turn bears on a collar $m$, secured to the pump-spindle. Suitable arrangements are made for lubricating this last-mentioned bearing. As shown in the figures, a lubricator $n$ and pipe $o$ serve to drip oil into the cup $r$, whence the oil passes through a slot $s$ to the bearing in question. By means of collars on the spindle or otherwise any end movement of the spindle is confined within narrow limits, the spring of the disk being sufficient to take up the small amount of wear that occurs. I may, however, provide this necessary elasticity in other ways—as, for instance, by using a rigid disk held up against an india-rubber ring by springs, which keep the rubber ring compressed and allow of a small movement of the disk without leakage of air. Water is fed from the discharge side of the pump through the pipe $t$, as shown in Fig. 4, to the space between the flange $d$ on the bearing-bush and the flexible disk, and water-grooves *u u* are cut in the white metal of the bush leading to the interior of the pump-casing, the bearing being in this way both cooled and lubricated. The conduit or connection *t*, which leads from the discharge side of the pump, not only subserves the function of lubricating and cooling the bearing parts, but also serves to balance the atmospheric pressure on the outside of the yieldable packing, thus reducing the wear at the joint to the least practicable amount consistent with air-tightness.

According to a second form of my invention tion (shown in Fig. 3) I use a disk of rubber *v* instead of metal, and I secure it in an air-tight manner at its outer circumference by clamping it between metal rings *w* and *x* to the flange *d* or in any other suitable manner.
At the inner circumference of the disk I secure it to a metal ring *z*, which bears against a collar 2 on the pump-spindle, the bearing being preferably of the spherical type to allow of any small transverse movement of the shaft without leaking.

By means of the improved devices described above I am able to dispense with the usual stuffing-box altogether and to utilize the space saved to give an extra long bearing to the spindle, the essential feature of my invention being the utilization of the whole or part of the vacuum of the pump-section to maintain the spindle-packing bearing-surfaces in engagement without excessive friction.

Although I have described my invention with reference to centrifugal pumps only, it is obvious that it may be applied to other machines also and that it may be used for preventing the leakage of other fluids or gases than air.

Having now described my invention, what I claim as new, and desire to secure by Letters Patent, is—

1. In a pump, the combination of a rotatable spindle element, a stationary element of the pump within which said spindle element rotates, an annular packing yieldingly secured fluid-tight to one element of the pump and bearing fluid-tight exteriorly against the other element thereof, and a conduit leading from the discharge side of the pump and serving to deliver water into the space between said packing and said stationary pump element, which water serves to balance the atmospheric pressure on the outside of said packing.

2. In a pump, the combination of a rotatable spindle element, a stationary element of the pump within which said spindle element rotates, an annular packing yieldingly secured fluid-tight to one element of the pump and bearing fluid-tight exteriorly against the other element thereof, and a conduit leading from the discharge side of the pump and serving to deliver water into the space between said packing and said stationary pump element, which water serves to balance the atmospheric pressure on the outside of said packing, the bearing-surface of said stationary pump element having grooves leading from said space into the interior of the pump.

In witness whereof have I hereunto set my hand in presence of two witnesses.

ALFRED MORCOM.

Witnesses:
HUME CHANCELLOR PINSENT,
HENRY HERBERT OLIVER.